(12) United States Patent
Sugihara et al.

(10) Patent No.: US 10,618,578 B2
(45) Date of Patent: Apr. 14, 2020

(54) CRAWLER

(71) Applicant: BRIDGESTONE CORPORATION, Chuo-ku, Tokyo (JP)

(72) Inventors: Shingo Sugihara, Tokyo (JP); Kenji Tateishi, Tokyo (JP); Takashi Mizusawa, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/577,348

(22) PCT Filed: Jun. 3, 2016

(86) PCT No.: PCT/JP2016/066690
§ 371 (c)(1),
(2) Date: Nov. 28, 2017

(87) PCT Pub. No.: WO2016/195102
PCT Pub. Date: Dec. 8, 2016

(65) Prior Publication Data
US 2018/0154959 A1   Jun. 7, 2018

(30) Foreign Application Priority Data
Jun. 5, 2015   (JP) .................... 2015-114708

(51) Int. Cl.
*B62D 55/24* (2006.01)
*B29D 29/08* (2006.01)

(52) U.S. Cl.
CPC .......... *B62D 55/244* (2013.01); *B62D 55/24* (2013.01); *B29D 29/08* (2013.01)

(58) Field of Classification Search
CPC ...... B62D 55/12; B62D 55/202; B62D 55/24; B62D 55/244; B62D 55/253; B29D 29/08
See application file for complete search history.

(56) References Cited

U.S. PATENT DOCUMENTS 6,079,802 A   6/2000 Nishimura et al.
6,267,458 B1  7/2001 Hansen et al.
(Continued)

FOREIGN PATENT DOCUMENTS

CN   103492258 A   1/2014
EP   0893334 A1    1/1999
(Continued)

OTHER PUBLICATIONS

Search Report of the Chinese office action dated Dec. 19, 2018, from the SIPO in a Chinese patent application corresponding to the instant patent application.
(Continued)

*Primary Examiner* — Jason R Bellinger
(74) *Attorney, Agent, or Firm* — SOLARIS Intellectual Property Group, PLLC

(57) ABSTRACT

A crawler includes crawler body formed by an elastic body shaped into an endless loop, a tensile body embedded in the crawler body and wound around a circumferential direction of the crawler body, guide projections formed at an inner circumferential surface of a width direction central portion of the crawler body and spaced apart in the circumferential direction of the crawler body, a flat face, upon which a rotating wheel provided at a vehicle rolls, forming an inner circumferential surface further toward a width direction outer side of the crawler body than the guide projections and an inclined face, upon which the rotating wheel rolls, inclined from an outer side end portion of the flat face in a crawler body width direction such that a thickness of the crawler body gradually increases toward the width direction outer side and circumferential inner side of the crawler body.

10 Claims, 6 Drawing Sheets

(56) References Cited

U.S. PATENT DOCUMENTS

| | | | |
|---|---|---|---|
| 6,402,268 B1 | 6/2002 | Lussier | |
| 6,450,593 B2* | 9/2002 | Hori | B62D 55/26 305/101 |
| 6,568,769 B1* | 5/2003 | Watanabe | B62D 55/244 305/171 |
| 6,942,305 B2* | 9/2005 | Ueno | B62D 55/244 305/165 |
| 7,201,457 B2* | 4/2007 | Katoh | B62D 55/253 305/165 |
| 7,967,398 B2* | 6/2011 | Uchida | B62D 55/244 305/165 |
| 2004/0222697 A1* | 11/2004 | Soucy | B62D 55/244 305/165 |
| 2007/0252433 A1 | 11/2007 | Fujita | |
| 2010/0096915 A1 | 4/2010 | Hagio | |
| 2014/0042801 A1 | 2/2014 | Shimozono | |
| 2018/0154959 A1 | 6/2018 | Sugihara et al. | |

FOREIGN PATENT DOCUMENTS

| | | |
|---|---|---|
| JP | 2003-182660 A | 7/2003 |
| JP | 2004-161193 A | 6/2004 |
| JP | 2013-166475 A | 8/2013 |
| WO | 2005/073060 A1 | 9/2007 |
| WO | 2008/096749 A1 | 5/2010 |
| WO | 2016/195102 A1 | 12/2016 |

OTHER PUBLICATIONS

International Search Report issued in International Application No. PCT/JP2016/066690 dated Jun. 28, 2016.

Examination Search Report of the Canadian office action dated Aug. 29, 2018, from the CIPO in a Canadian patent application corresponding to the instant patent application.

* cited by examiner

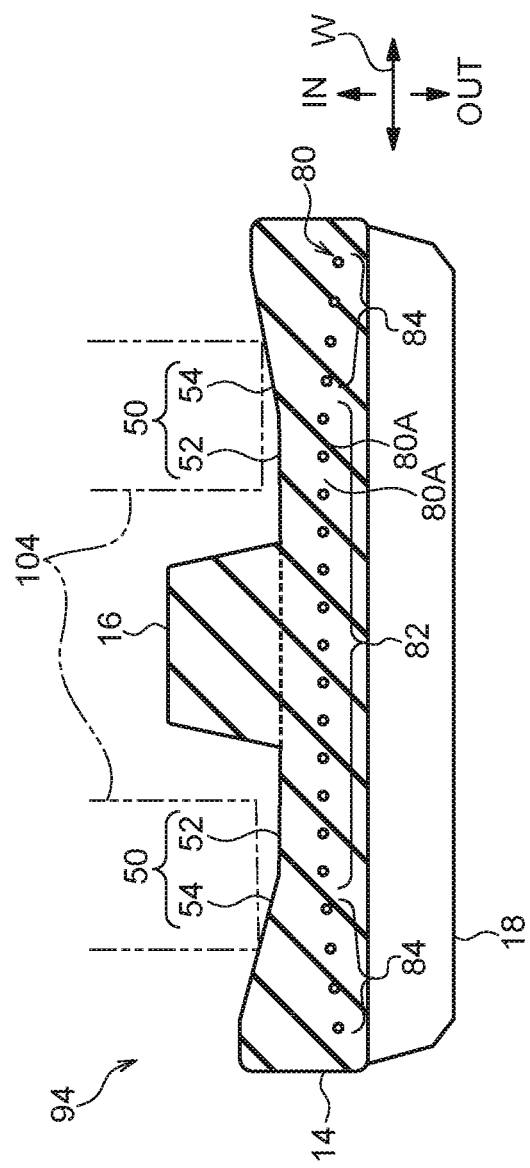

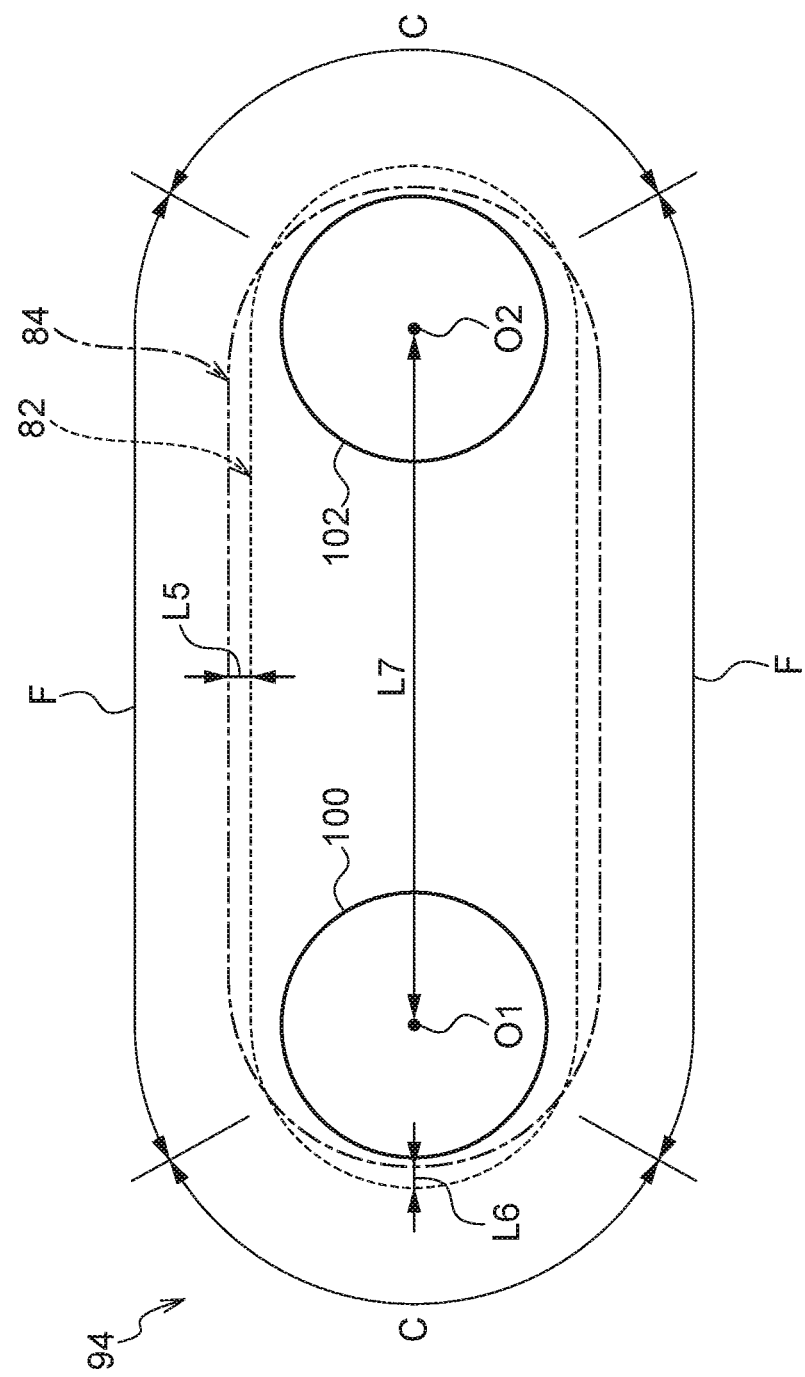

CRAWLER

CROSS-REFERENCE TO RELATED APPLICATIONS

The present application is a U.S. national stage application of application PCT/JP2016/066690, which was filed Jun. 3, 2016, which claims priority to Japanese Patent Application 2015-114708, which was filed Jun. 5, 2015. The present application hereby incorporates by reference both applications referenced above.

TECHNICAL FIELD

One aspect of the present invention relates to a crawler.

BACKGROUND ART

Japanese Patent Application Laid-Open (JP-A) No. 2004-161193 describes a crawler having an inner circumferential surface that is inclined in order to suppress snaking of the crawler during travel over uneven terrain or while turning, thus increasing the ability of the vehicle to hold a straight line.

SUMMARY OF INVENTION

Technical Problem

However, according to JP-A No. 2004-161193, since the entire inner circumferential surface of the crawler, this being a wheel-rolling face for rollers, is inclined, there may be localized application of flexural stress on the inner circumferential surface when entrained on a drive wheel or an idler wheel, or of pressing force on the inner circumferential surface from a roller.

In consideration of the above circumstances, an object of one aspect of the present invention is to suppress snaking of a crawler while alleviating localized force applied to the crawler.

Solution to Problem

A crawler of a first aspect of the present invention includes a crawler body, a tensile body, guide projections, a flat face, and an inclined face. The crawler body is formed by an elastic body shaped into an endless loop. The tensile body is embedded in the crawler body, and is wound around a circumferential direction of the crawler body. The guide projections are formed at an inner circumferential surface of a width direction central portion of the crawler body, and the guide projections are spaced apart in the circumferential direction of the crawler body. The flat face, upon which a rotating wheel provided at a vehicle rolls, forms an inner circumferential surface further toward a width direction outer side of the crawler body than the guide projections. The inclined face, upon which the rotating wheel rolls, is inclined from an outer side end portion of the flat face in a crawler body width direction such that a thickness of the crawler body gradually increases toward the width direction outer side and circumferential inner side of the crawler body.

With the crawler of the first aspect of the present invention, when the crawler is about to snake, the relative positions of the rotating wheel and the crawler body shift in the crawler body width direction, and the rotating wheel presses the inclined face formed on one crawler width direction side of the inner circumferential surface of the crawler body toward the crawler circumferential outer side. When this occurs, the elastic body on the crawler body circumferential outer side of the inclined face presses on the tensile body such that tension is generated in the tensile body on the one crawler body width direction side (the pressed side) and a difference in tension to the other crawler body width direction side of the tensile body arises. The crawler body moves toward the one crawler body width direction side where tension is higher so as to eliminate the difference in tension (the rotating wheel moves relative to the crawler body toward the other width direction side where tension is lower). Namely, the width direction center of the crawler body moves toward the width direction center of the rotating wheel. As a result, the relative positions of the crawler body width direction center of the rotating wheel and the width direction center of the crawler body become aligned. This enables snaking of the crawler to be suppressed.

Moreover, since the rotating wheel also rolls on the flat face, localized force applied to the crawler inner circumferential surface by the rotating wheel is able to be alleviated compared to a crawler in which the entire wheel-rolling face is an inclined face. This enables damage to the crawler inner circumferential surface to be suppressed.

A crawler of a second aspect of the present invention is the crawler of the first aspect, wherein a thickness from an imaginary plane of an extension of the flat face along the crawler body width direction to an outer side edge of the inclined face in the crawler body width direction is from 0.5% to 3% of a width direction length of the crawler body.

In the crawler of the second aspect of the present invention, the thickness from an imaginary plane of an extension of the flat face along the crawler body width direction to the outer side edge of the inclined face in the crawler body width direction is at least 0.5% of the width direction length of the crawler body. Thus, when the crawler begins to snake, greater tension is generated in the one crawler body width direction side of the tensile body than in a crawler in which the thickness from the imaginary plane to the outer side edge of the inclined face in the crawler body width direction is less than 0.5% of the width direction length of the crawler. This makes it easier for the crawler body to move toward the one crawler body width direction side where tension is higher, and enhances the advantageous effect of suppressing snaking of the rubber crawler.

Moreover, since the relative positions of the crawler body width direction center of the rotating wheel and the width direction center of the crawler body are in alignment, contact between the guide projections at the width direction central portion of the crawler and the rotating wheel is suppressed. This enables damage to the guide projections to be suppressed.

Further, the thickness from the imaginary plane of an extension of the flat face along the crawler body width direction to the outer side edge of the inclined face in the crawler body width direction is not greater than 3% of the width direction length of the crawler body. Thus, when the roller rolls on the inclined face, the load acting on the flat face and the inclined face from the roller is more even than in a crawler in which the thickness from the imaginary plane to the outer side edge of the inclined face in the crawler body width direction is greater than 3% of the width direction length of the crawler body. This enables damage to the crawler inner circumferential surface due to wear from the wheels to be suppressed.

A crawler of a third aspect of the present invention is the crawler of the first aspect or the second aspect, wherein an end portion of the tensile body in the crawler body width direction is positioned further toward the crawler body width direction outer side than an end portion of the inclined face in the crawler body width direction.

In the crawler of the third aspect of the present invention, as the end portion of the tensile body in the crawler body width direction is positioned further toward the crawler body width direction outer side than an end portion of the inclined face in the crawler body width direction, the tensile body is embedded in the entire area at the circumferential outer side of the inclined face of the crawler body. Thus, when the relative positions of the rotating wheel and the crawler body are substantially misaligned in the crawler body width direction and the end portion of the inclined face in the crawler body width direction presses on a rotating wheel when the crawler snakes, tension is generated in the tensile body positioned at the crawler body circumferential outer side of the inclined face.

As a result, the advantageous effect of pushing the guide projections formed at the width direction central portion of the crawler back toward the center of the roller is enhanced.

A crawler of a fourth aspect of the present invention is the crawler of any one aspect of the first aspect to the third aspect, wherein the crawler is a coreless crawler that does not have a metal core.

The crawler of the fourth aspect of the present invention does not have a metal core, and therefore the crawler body has less flexural rigidity than a crawler that does have a metal core. When tension is generated in the width direction outer side end portion of the tensile body, this makes it easier for the width direction outer side end portions of the crawler body to bend toward the circumferential inner side of the crawler body. The guide projections of the crawler are therefore easier to push back toward the center of the roller.

Advantageous Effects of Invention

With a crawler according to an aspect of the present invention, snaking of the crawler can be suppressed while alleviating localized force applied to the crawler.

BRIEF DESCRIPTION OF DRAWINGS

FIG. 3A is a lateral cross-section of a linear section of a crawler according to a second exemplary embodiment of the present invention.

FIG. 4 is a side view illustrating the shapes of a crawler width direction outer side end portion of an inclined portion, and of a flat portion, of a crawler according to the second exemplary embodiment of the present invention.

DESCRIPTION OF EMBODIMENTS

First Exemplary Embodiment

Explanation follows regarding a rubber crawler 90, which serves as an example of a crawler according to a first exemplary embodiment of the present invention, with reference to the drawings.

Figure 1:
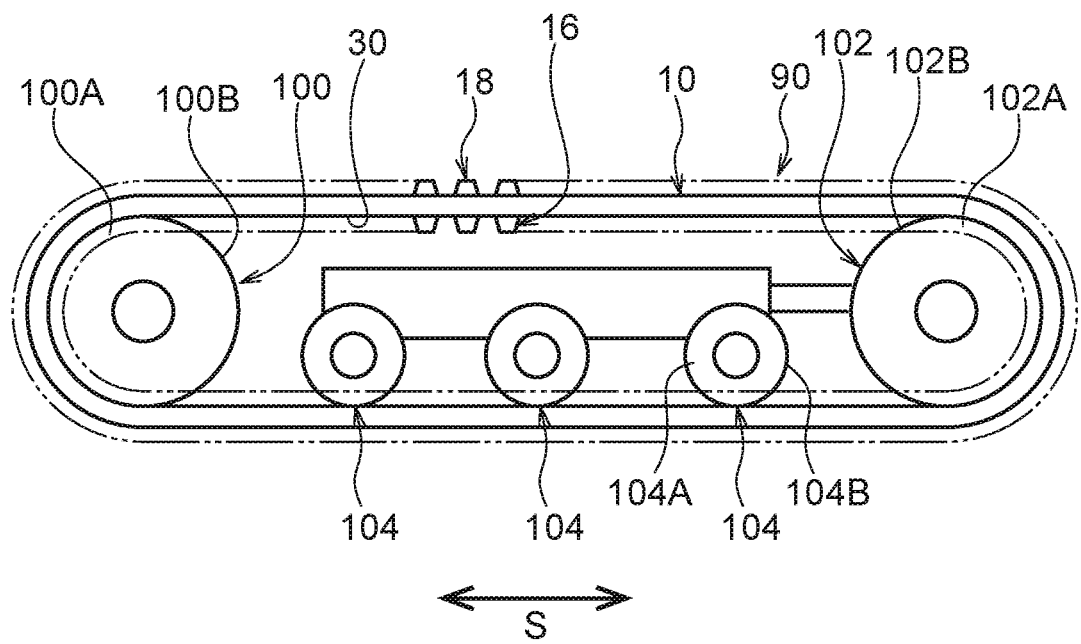
FIG. 1 is a side view illustrating a crawler according to a first exemplary embodiment of the present invention in a state in which the crawler is entrained about a drive wheel and an idler wheel.

As illustrated in FIG. 1, the rubber crawler 90 of the present exemplary embodiment is employed entrained about a drive wheel 100 that is coupled to a drive shaft of a tracked vehicle serving as a machine body, and about an idler wheel 102 that is attached to the tracked vehicle so as to be freely rotatable. Plural rollers 104, disposed between the drive wheel 100 and the idler wheel 102 and attached to the tracked vehicle so as to be freely rotatable, roll against the inner circumferential surface of the rubber crawler 90. Note that the drive wheel 100, the idler wheel 102, and the rollers 104 of the present exemplary embodiment are examples of rotating wheels of the present exemplary embodiment.

In the present exemplary embodiment, a circumferential direction (the direction indicated by the arrow S in FIG. 1) of the endless rubber crawler 90 is referred to as a "crawler circumferential direction", and a width direction (the direction indicated by the arrow W in FIG. 2A) of the rubber crawler 90 is referred to as a "crawler width direction".

Further, in the present exemplary embodiment, the circumferential inner side (the side in the direction indicated by the arrow IN in FIG. 2A) of the rubber crawler 90 entrained in an loop shape about the drive wheel 100 and the idler wheel 102 is referred to as the "crawler circumferential inner side", and the circumferential outer side of the rubber crawler 90 (the side in the direction indicated by the arrow OUT in FIG. 2A) is referred to as the "crawler circumferential outer side". Note that the arrow IN direction (the direction toward the inside of the loop shape) and the arrow OUT direction (the direction toward the outside of the loop shape) in FIG. 2A indicate directions inside and outside of the rubber crawler 90 when in an entrained state.

As illustrated in FIG. 1, the drive wheel 100 includes a pair of circular disk shaped wheel portions 100A that are coupled to the drive shaft of the tracked vehicle. Outer circumferential surfaces 100B of the wheel portions 100A each contact and roll against a respective wheel-rolling face 30 of the rubber crawler 90, described below. Pins (not illustrated in the drawings) are formed at the pair of wheel portions 100A with uniform spacing in the circumferential direction of so as to span between respective circumferential edge portions of the pair of wheel portions 100A. The pins engage (mesh) with guide projections 16, described below, and transmit drive force from the tracked vehicle to the rubber crawler 90 by engaging with the guide projections 16.

The idler wheel 102 includes a pair of circular disk shaped wheel portions 102A attached to the tracked vehicle so as to be freely rotatable. Outer circumferential surfaces 102B of the wheel portions 102A each contact and roll against the respective wheel-rolling face 30 of the rubber crawler 90, described below. The idler wheel 102 is pressed against the wheel-rolling faces 30 of the rubber crawler 90 in a direction away from the drive wheel 100 by, for example, a hydraulic pressing mechanism, not illustrated in the drawings, provided to the tracked vehicle side. Tension (tensile force) in the rubber crawler 90 is maintained by pressing the idler wheel 102 against the wheel-rolling faces 30.

In this manner, the rubber crawler 90 to which drive force is transmitted circulates around the drive wheel 100 and the idler wheel 102. As a result of this circulation of the rubber crawler 90, lugs 18, described below, grip the ground surface and the tracked vehicle moves (travels).

As illustrated in FIG. 1, the rollers 104 each include a pair of circular disk shaped wheel portions 104A attached to the tracked vehicle so as to be freely rotatable. The weight of the tracked vehicle is supported by the rollers 104. Outer circumferential surfaces 104B of the wheel portions 104A each roll over the respective wheel-rolling face 30 of the rubber crawler 90, described below.

The idler wheel 102 and the rollers 104 rotate following the rubber crawler 90.

Rubber Crawler

Figure 2A:
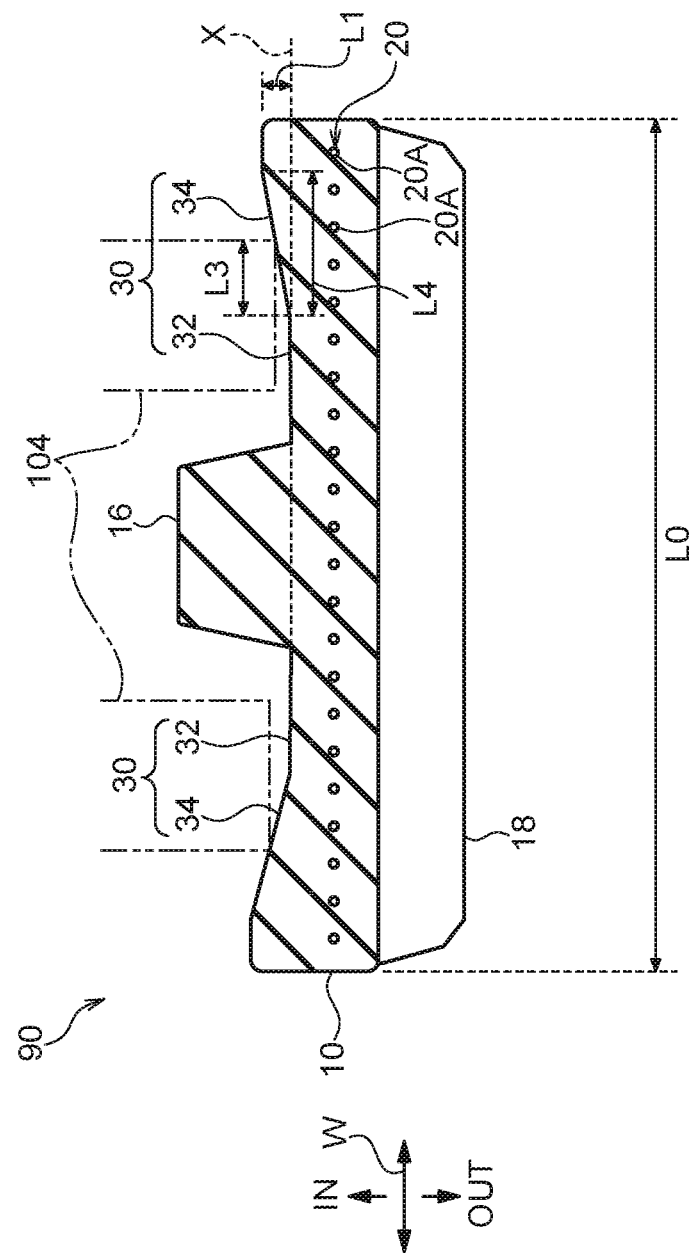
FIG. 2A is a lateral cross-section of a crawler according to the first exemplary embodiment of the present invention.

As illustrated in FIG. 2A, the rubber crawler 90 is configured including a rubber crawler body 10, the guide projections 16, the lugs 18, and a tensile body 20 inside the rubber crawler body. Note that in the present exemplary embodiment, the rubber crawler 90 is configured as a coreless rubber crawler that does not have a metal core.

Figure 2B:
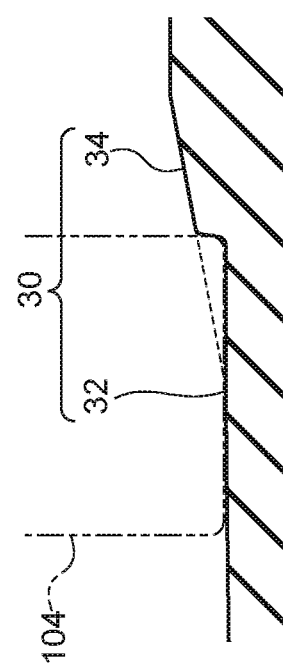
FIG. 2B is a partial cross-section illustrating a crawler according to the first exemplary embodiment of the present invention in a state in which the crawler is bearing load from a vehicle.

FIG. 2A is a lateral cross-section of the rubber crawler 90 of the first exemplary embodiment along a plane that is perpendicular to an axis in the crawler circumferential direction. As illustrated in FIG. 2B, the wheel-rolling faces 30 described below are pressed by the rollers 104 such that the wheel-rolling faces 30 deform following the shape of the rollers 104. However, in order to make the shape of the wheel-rolling faces 30 clear, FIG. 2A illustrates the shape of the wheel-rolling faces 30 prior to deformation.

Guide Projections

As illustrated in FIG. 2A, the guide projections 16, serving as an example of guide projections in the present exemplary embodiment, are rubber projections in the shape of truncated square pyramids and are integrally molded to the rubber crawler body 10. The guide projections 16 are formed at a central portion of the inner circumferential surface of the rubber crawler body 10 with uniform pitch (spacing) in the crawler circumferential direction. The guide projections 16 mesh with the pins of the drive wheel 100 to transmit drive force from the tracked vehicle to the rubber crawler 90.

Further, the guide projections 16 are positioned at the center of the rollers 104 that roll over the wheel-rolling faces 30 described below, and movement of the rubber crawler 90 in the crawler width direction is restricted by contact between the guide projections 16 and side faces of the drive wheel 100, idler wheel 102, and rollers 104.

Rubber Crawler Body

As illustrated in FIG. 1 and FIG. 2A, the rubber crawler body 10, serving as an example of a crawler body in the present exemplary embodiment, is an endless belt shaped rubber belt and is formed with the wheel-rolling faces 30 at both crawler width direction sides of the guide projections 16 (the left and right of the inner circumferential surface in FIG. 2A). The drive wheel 100, the idler wheel 102, and the rollers 104 are configured to roll over the wheel-rolling faces 30.

Each wheel-rolling face 30 is configured by a flat face 32 and an inclined face 34. The flat faces 32 are formed at the crawler width direction outer sides of the guide projections 16. The inclined faces 34 are formed at the crawler width direction outer sides of the flat faces 32, and are inclined such that the thickness of the rubber crawler body 10 gradually increases toward the crawler width direction outer sides and the crawler circumferential inner side.

Further, from an edge of each inclined face 34, the crawler width direction outer side of the rubber crawler body 10 is configured as a flat face such that end portions of the rubber crawler body 10 have a constant thickness.

A thickness (incline height) L1 from an imaginary plane X of an extension of each flat face 32 along the crawler width direction to the crawler width direction outer side edge of the respective inclined face 34 is a distance that is 2% of a width direction length L0 of the rubber crawler 90.

Note that although each of the inclined faces 34 is inclined in a straight line shape in FIG. 2A, embodiments of the present invention are not limited thereto, and the inclined faces 34 may be inclined in a curved line shape. Both in cases in which the inclined faces are inclined straight line shapes and in cases in which the inclined faces are inclined in curved line shapes, the edges of the inclined faces refer to portions where the inclined faces connect to the flat faces at the crawler width direction outer sides of the rubber crawler body 10.

Further, when the axial direction centers of the rollers 104 are positioned at the width direction center of the rubber crawler 90, a length L3 of portions where the rollers 104 contact the respective inclined face 34 is a length that is 50% of a length (incline width) L4 from the crawler width direction inner side edge of the inclined face 34 to the crawler width direction outer side edge of the inclined face 34. Namely, the rollers 104 contact the flat faces 32 and the inclined faces 34.

Note that in FIG. 2A, the rollers 104 are illustrated in a state contacting only the inclined faces 34 in order to explain the configuration of the rubber crawler 90. However, as illustrated in FIG. 2B, in a state in which the rubber crawler 90 is entrained around the drive wheel 100 and the idler wheel 102, the inclined faces 34 are pressed by the rollers 104 so as to deform toward the crawler circumferential outer side, and the rollers 104 also contact the flat faces 32.

Further, although in the present exemplary embodiment the incline height L1 of the inclined faces 34 is 2% of the width direction length L0 of the rubber crawler 90, embodiments of the present invention are not limited to this configuration, and the incline height L1 of the inclined faces 34 may, for example, be from 0.5% to 3% of the width direction length L0 of the rubber crawler 90.

Further, although in the present exemplary embodiment the length L3 of the portions where the rollers 104 contact the respective inclined face 34 is 50% of the incline width L4 of the inclined faces 34, embodiments of the present invention are not limited to this configuration, and the length L3 of the portions where the rollers 104 contact the respective inclined face 34 may, for example, be from 0% to 80% of the incline width L4 of the inclined faces 34.

Tensile Body

As illustrated in FIG. 2A, the tensile body 20, serving as an example of a tensile body in the present exemplary embodiment, is configured by winding a main cord 20A around the crawler circumferential direction into a helical shape arranged having equal spacings in the crawler width direction, and embedding the main cord 20A in the rubber crawler body 10. In the present exemplary embodiment, crawler width direction end portions of the tensile body 20 are positioned further toward the crawler width direction outer side than the crawler width direction outer side end portions of the inclined faces 34 of the wheel-rolling faces 30.

Steel cord, embedded to augment the tensile strength of the rubber crawler 90 in the crawler circumferential direction, is employed for the main cord 20A configuring the tensile body 20 of the present exemplary embodiment. The steel cord is configured of plural strands of steel that have been twisted together. Each of these strands is formed by twisting together plural filaments. The tensile strength of the rubber crawler 90 is thus increased in the crawler circumferential direction.

Note that embodiments of the present invention are not limited to this configuration, and so long as it has sufficient tensile strength, an organic fiber cord configured of organic fibers (such as, for example, nylon fibers or aromatic polyamide fibers) may be employed for the main cord.

Further, although only the tensile body 20 is embedded in the rubber crawler body 10 in the present exemplary embodiment, embodiments of the present invention are not limited to this configuration. For example, configuration may be made such that reinforcing cords that crosses the tensile body 20, as viewed from the crawler circumferential inner side or the crawler circumferential outer side, are arrayed in the crawler circumferential direction at least at one out of the crawler circumferential inner side or the crawler circumferential outer side of the tensile body 20.

Further, although the main cord 20A is wound around the crawler circumferential direction into a helical shape in the present exemplary embodiment, plural main cords may be arrayed running along the crawler circumferential direction (namely, arrayed in the crawler width direction).

Lugs

As illustrated in FIG. 2A, the lugs 18 are rubber projections integrally molded to the rubber crawler body 10, and are formed at the outer circumferential surface of the rubber crawler body 10 with uniform pitch therebetween in the crawler circumferential direction. The lugs 18 are positioned at the crawler circumferential outer side of the crawler width direction end portions of the inclined faces 34 of the wheel-rolling faces 30.

Note that the lugs 18 are locations where the rubber crawler 90 makes contact with the ground surface.

Effects

In the rubber crawler 90 of the first exemplary embodiment, the tensile body 20 is embedded in the rubber crawler body 10, and the crawler width direction end portions of the tensile body 20 are positioned further toward the crawler width direction outer side than the crawler width direction outer side end portions of the inclined faces 34 of the wheel-rolling faces 30.

Thus, when the rubber crawler 90 is about to snake, the crawler width direction positions of the drive wheel 100, the idler wheel 102, and the rollers 104 shift relative to the rubber crawler body 10, and the drive wheel 100, the idler wheel 102, and the rollers 104 press the inclined face 34 on one crawler width direction side toward the crawler circumferential outer side. When this occurs, elastic body on the crawler circumferential outer side of the inclined face 34 presses on the tensile body 20 such that tension is generated in the tensile body 20 on the one crawler width direction side (the pressed side) and a difference in tension to the other crawler width direction side of the tensile body 20 arises. Then, the rubber crawler body 10 moves toward the one crawler width direction side where tension is higher so as to eliminate the difference in tension within the tensile body 20 (the drive wheel 100, the idler wheel 102, and the rollers 104 move relative to the rubber crawler body 10 toward the other width direction side where tension is lower). Namely, the width direction center of the rubber crawler body 10 moves toward the width direction center of the drive wheel 100, the idler wheel 102, and the rollers 104. As a result, the relative positions of the crawler width direction centers of the drive wheel 100, the idler wheel 102, and the rollers 104, and the crawler width direction center of the rubber crawler body 10, become aligned. This enables snaking of the rubber crawler 90 to be suppressed.

Moreover, since the drive wheel 100, the idler wheel 102, and the rollers 104 also contact the flat faces 32 of the wheel-rolling faces 30, localized force applied to the wheel-rolling faces 30 by the drive wheel 100, the idler wheel 102, and the rollers 104 is able to be alleviated compared to structures that do not include the flat faces 32. This enables damage to the wheel-rolling faces 30 to be suppressed.

Second Exemplary Embodiment

Explanation follows regarding a rubber crawler 94, which serves as an example of an elastic crawler of a second exemplary embodiment, with reference to the drawings. Note that portions configured the same as those of the first exemplary embodiment are appended with the same reference numerals, and description thereof is omitted.

Rubber Crawler Body

Figure 3B:
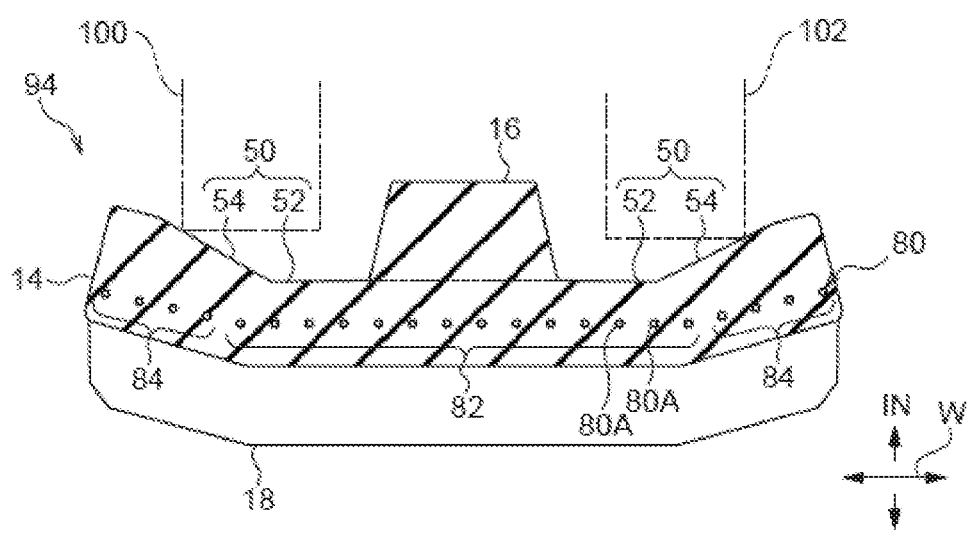
FIG. 3B is a lateral cross-section of a curved section of a crawler according to the second exemplary embodiment of the present invention.

As illustrated in FIG. 3A and FIG. 3B, a rubber crawler body 14 is an endless belt shaped rubber belt, and is formed with a wheel-rolling face 50 at each crawler width direction side of the guide projections 16 (the left and right of the inner circumferential surface in FIG. 3A). The drive wheel 100, the idler wheel 102, and the rollers 104 are configured to roll over the wheel-rolling faces 50.

Each wheel-rolling face 50 is configured by a flat face 52 and an inclined face 54. The flat faces 52 are formed at the crawler width direction outer sides of the guide projections 16. The inclined faces 54 are formed at the crawler width direction outer sides of the flat faces 52, and are inclined such that the thickness of the rubber crawler body 14 gradually increases on progression toward the crawler width direction outer sides.

Further, from an edge of each inclined face 54, the crawler width direction outer side of the rubber crawler body 14 is configured as a flat face such that end portions of the rubber crawler body 14 have a constant thickness. Note that the flat faces 52 and the inclined faces 54 are configured identically to the flat faces 32 and the inclined faces 34 of the wheel-rolling faces 30 of the first exemplary embodiment.

Note that in FIG. 3A, the rollers 104 are illustrated in a state contacting only the inclined faces 54 in order to explain the configuration of the rubber crawler 94. However, the inclined faces 54 are pressed by the rollers 104 so as to deform toward the crawler circumferential outer side following the shape of the rollers 104, and the rollers 104 also contact the flat faces 52.

Tensile Body

As illustrated in FIG. 3A and FIG. 3B, a tensile body 80 is configured by winding a main cord 80A around the crawler circumferential direction into a helical shape arranged having equal spacings in the crawler width direction, and embedding the main cord 80A inside the rubber crawler body 14. In the present exemplary embodiment, crawler width direction end portions of the tensile body 80 are positioned further toward the crawler width direction outer side than the crawler width direction outer side end portions of the inclined faces 54 of the wheel-rolling faces 50.

The tensile body 80 includes a flat portion 82 at the crawler width direction central side thereof, and inclined portions 84 at the crawler width direction outer sides of the flat portion 82.

In any cross-section (for example, FIG. 3A and FIG. 3B) taken along the crawler width direction orthogonal to the crawler circumferential direction, the flat portion 82 is a portion where the main cord 80A is arranged having equal spacings along the crawler width direction. The flat portion 82 is formed straddling the center of the rubber crawler 94, and end portions of the flat portion 82 are positioned further toward the crawler width direction outer sides than the guide projections 16.

In any cross-section (for example, FIG. 3A and FIG. 3B) taken along the crawler width direction orthogonal to the crawler circumferential direction, the inclined portions 84 are portions where the main cord 80A is arranged having equal spacings in the crawler width direction so as to be inclined with respect to the crawler width direction, and as illustrated in FIG. 3A, looking on the side of the rubber crawler 94, in linear sections F (namely, in sections not entrained on the drive wheel 100 or the idler wheel 102; see FIG. 4), the inclined portions 84 are portions inclined toward the crawler circumferential outer side.

Further, as illustrated in FIG. 3B, looking on the side of the rubber crawler 94, in curved sections C (namely, in sections entrained on the drive wheel 100 or the idler wheel 102; see FIG. 4), the inclined portions 84 are inclined toward the crawler circumferential inner side.

Note that the positions where the incline of the inclined portions 84 changes from the crawler circumferential outer side toward the crawler circumferential inner side (positions as viewed from the side of the rubber crawler 94) and the positions of the end portions where the rubber crawler 94 ceases to be entrained on the drive wheel 100 or the idler wheel 102 do not necessarily have to match. It is sufficient that the inclined portions 84 have a portion inclined toward the crawler circumferential outer side in at least some part of the linear sections F, and that the inclined portions 84 have a portion inclined toward the crawler circumferential inner side in at least some part of the curved sections C.

The crawler circumferential direction length of the tensile body 80 is uniform across the crawler width direction. Namely, the crawler circumferential direction lengths in the inclined portions 84 are formed so as to be identical to the crawler circumferential direction lengths in the flat portion 82. In other words, the length of one crawler circumferential direction winding of the main cord 80A in the inclined portions 84 is equal to the length of one crawler circumferential direction winding of the main cord 80A in the flat portion 82.

Accordingly, for example, in the linear sections F, the crawler width direction outer side end portions of the inclined portions 84, illustrated by a single-dotted dashed line in FIG. 4, are positioned further toward the crawler circumferential outer side than the flat portion 82, illustrated by a dashed line in FIG. 4. In the curved sections C, the crawler width direction outer side end portions of the inclined portions 84 are positioned further toward the crawler circumferential inner side than the flat portion 82.

Note that "uniform", "same", and "identical" do not indicate states of total agreement, and encompass a margin of error of approximately ±1% between the lengths of individual windings in the crawler circumferential direction.

A "length of an individual winding in the crawler circumferential direction" is a length along the main cord 80A from any given cross-section (for example, the cross-section illustrated in FIG. 2A) taken along the crawler width direction orthogonal to the crawler circumferential direction, back to the same cross-section. In other words, it would be the length of one piece of the main cord 80A if the tensile body 80 was to be cut at the cross-section.

Note that as illustrated in FIG. 4, in the linear sections F, as viewed from the side of the rubber crawler 94, a distance L5 is 0.35% of a distance L7, where the distance L5 is the distance (outward incline height) between the crawler width direction outer side end portions of the inclined portions 84 (the single-dotted dashed line portion) and the flat portion 82 (the dashed line portion), and the distance L7 is the distance (the inter-axis distance) between the axis of rotation O1 of the drive wheel 100 and the axis of rotation O2 of the idler wheel 102.

Note that when viewed from the side of the rubber crawler 94, the distance L5 is an rough approximation of the distance between the crawler circumferential outer side end of the main cord 80A at any location in the flat portion 82 and the crawler circumferential outer side end of the main cord 80A at the crawler width direction outer side end portions of the inclined portions 84, as measured at a position passing through the center line of a line segment linking the axis of rotation O1 and the axis of rotation O2 together.

Effects

As illustrated in FIG. 3A, in the rubber crawler 94 of the second exemplary embodiment, where the inclined portions 84 are positioned in the linear sections F, the rollers 104 contact the inclined faces 54 of the wheel-rolling faces 50. Further, the crawler width direction end portions of the tensile body 80 embedded in the rubber crawler body 14 are positioned further toward the crawler width direction outer side than the crawler width direction outer side end portions of the inclined faces 54 of the wheel-rolling faces 50.

Thus, when the rubber crawler 94 is about to snake, the crawler width direction positions of the rollers 104 shift relative to the rubber crawler body 14, and the rollers 104 press the inclined face 54 on one crawler width direction side toward the crawler circumferential outer side. When this occurs, elastic body on the crawler circumferential outer side of the inclined face 54 presses on the tensile body 80 such that tension is generated in the tensile body 80 on the one crawler width direction side (the pressed side) and a difference in tension to the other crawler width direction side of the tensile body 80 arises. Then, the rubber crawler body 14 moves toward the one crawler width direction side where tension is higher so as to eliminate the difference in tension within the tensile body 80 (the rollers 104 move relative to the rubber crawler body 14 toward the other width direction side where tension is lower). Namely, the width direction center of the rubber crawler body 14 moves toward the width direction center of the rollers 104. As a result, the relative positions of the crawler width direction centers of the rollers 104 and the crawler width direction center of the rubber crawler body 14 become aligned. This enables snaking of the rubber crawler 94 to be suppressed.

Moreover, since the rollers 104 also contact the flat faces 52, localized force applied to the wheel-rolling face 50 by the rollers 104 is able to be alleviated compared to structures that do not include the flat faces 52. This enables damage to the wheel-rolling faces 50 to be suppressed.

In addition, when the rubber crawler 94 rotates and the inclined portions 84 of the tensile body 80 move from a linear section F (see FIG. 4) to a curved section C (see FIG. 4), as illustrated in FIG. 3B, the crawler width direction end portions of the tensile body 80 move substantially toward the crawler circumferential inner side and the rubber crawler body 14 is bent toward the crawler circumferential inner side due to the incline of the inclined portions 84 switching from the crawler circumferential outer side toward the crawler circumferential inner side. The angle of inclination of the inclined faces 54 accordingly increases, and the guide projections 16 of the rubber crawler 94 are forcefully pushed back toward the center of the drive wheel 100 and the idler wheel 102. This enables the advantageous effect of suppressing snaking of the rubber crawler 94 to be enhanced. Further, contact between the side faces of the guide projections 16 and the rollers 104 is suppressed, thereby suppressing damage to the guide projections 16.

Moreover, as illustrated in FIG. 4, the height of the outward incline of the inclined portions 84 in the linear sections F, namely the distance L5, is 0.35% of the distance (inter-axis distance) L7 between the axis of rotation O1 of the drive wheel 100 and the axis of rotation O2 of the idler wheel 102.

As a result, in the curved sections C, the inclined portions 84, which contact the drive wheel 100 and the idler wheel 102, are configured having sufficient widths of inward incline (namely, the distance between the crawler width direction outer side end portions of each inclined portion 84 and the flat portion in the curved sections C) L6 to push the guide projections 16 back toward the center of the rollers 104.

Note that although the distance (outward incline height) L5 is 0.35% of the distance (inter-axis distance) L7 in the present exemplary embodiment, embodiments of the present invention are not limited to this configuration. It is sufficient that the distance L5 be no less than 0.1% of the distance L7.

If the distance L5 is less than 0.1% of the distance L7, in the curved sections C, the inclined portions 84, which contact the drive wheel 100 and the idler wheel 102, are not configured with sufficient inward incline widths to push the guide projections 16 back toward the center of the rollers 104, and the advantageous effect of suppressing snaking of the rubber crawler 94 may be reduced.

Explanation has been given regarding exemplary embodiments for implementing the present invention; however, these exemplary embodiments are merely examples, and various modifications may be implemented within a range not departing from the spirit of the present invention. It goes without saying that the scope of rights encompassed by the present invention is not limited to these exemplary embodiments.

For example, in the exemplary embodiments described above, although a rubber crawler 90, 94 in which a rubber material is formed into an endless belt shape is given as an example of a crawler of the present invention, embodiments of the present invention are not limited to this configuration, and the crawler may be a belt-shaped body in which an elastomer or the like other than rubber is formed into an endless belt shape.

Moreover, in the exemplary embodiment described above, although the crawler width direction end portions of the tensile body 20 are positioned further toward the crawler width direction outer sides than the crawler width direction outer side end portions of the inclined faces 34 of the wheel-rolling faces 30, embodiments of the present invention are not limited thereto. For example, it is sufficient that the crawler width direction end portions of tensile body be positioned at the crawler circumferential outer side of the inclined faces 34 of the wheel-rolling faces 30. So long as the crawler width direction end portions of a tensile body are positioned at the crawler circumferential outer side of the inclined faces 34 of the wheel-rolling faces 30, when the crawler is about to snake, tension is generated in the tensile body, thus enabling snaking of the crawler to be suppressed.

Moreover, in the exemplary embodiments described above, although the guide projections 16 of the rubber crawler 90, 94 engage with the pins formed at the wheel portions 100A of the drive wheel 100 to transmit drive force from the tracked vehicle to the rubber crawler 90, 94, embodiments of the present invention are not limited thereto. For example, the rubber crawler may be a friction-driven rubber crawler in which the outer circumferential surfaces 100B of the drive wheel 100 contact an inner circumferential surface of the rubber crawler (namely, the wheel-rolling faces 30, 50) and drive is transmitted by friction therebetween.

The disclosure of Japanese Patent Application No. 2015-114708, filed on Jun. 5, 2015, is incorporated in its entirety by reference herein. All cited documents, patent applications, and technical standards mentioned in the present specification are incorporated by reference in the present specification to the same extent as if each cited document, patent application, or technical standard was specifically and individually indicated to be incorporated by reference.

The invention claimed is:

1. A crawler, comprising:
    a crawler body formed by an elastic body shaped into an endless loop;
    a tensile body that is embedded in the crawler body, and that is wound around a circumferential direction of the crawler body;
    guide projections that are formed at an inner circumferential surface of a width direction central portion of the crawler body, the guide projections being spaced apart in the circumferential direction of the crawler body;
    a face upon which a rotating wheel of a vehicle rolls, the face forming an inner circumferential surface further toward a width direction outer side of the crawler body than the guide projections; and
    an inclined face upon which the rotating wheel rolls, the inclined face being inclined from an outer side end portion of the face in a crawler body width direction such that a thickness of the crawler body increases toward the width direction outer side and circumferential inner side of the crawler body,
    wherein the rotating wheel contacts the face and a part of the inclined face, the part of the inclined face corresponding to a length that is 80% or less of a length from a crawler width direction inner side edge of the inclined face to a crawler width direction outer side edge of the inclined face.

2. The crawler of claim 1, wherein a thickness from an imaginary plane of an extension of the face along the crawler body width direction to an outer side edge of the inclined face in the crawler body width direction is from 0.5% to 3% of a width direction length of the crawler body.

3. The crawler of claim 1, wherein an end portion of the tensile body in the crawler body width direction is positioned further toward the crawler body width direction outer side than an end portion of the inclined face in the crawler body width direction.

4. The crawler of claim 1, wherein the crawler is a coreless crawler that does not have a metal core.

5. The crawler of claim 1, wherein a thickness from an imaginary plane of an extension of the face along the crawler body width direction to an outer side edge of the inclined face in the crawler body width direction is from 0.5% to 3% of a width direction length of the crawler body, and wherein an end portion of the tensile body in the crawler body width direction is positioned further toward the crawler body width direction outer side than an end portion of the inclined face in the crawler body width direction.

6. The crawler of claim 1, wherein a thickness from an imaginary plane of an extension of the face along the crawler body width direction to an outer side edge of the inclined face in the crawler body width direction is from 0.5% to 3% of a width direction length of the crawler body, and the crawler is a coreless crawler that does not have a metal core.

7. The crawler of claim 1, wherein an end portion of the tensile body in the crawler body width direction is positioned further toward the crawler body width direction outer side than an end portion of the inclined face in the crawler body width direction, and the crawler is a coreless crawler that does not have a metal core.

8. The crawler of claim 1, wherein a thickness from an imaginary plane of an extension of the face along the crawler body width direction to an outer side edge of the inclined face in the crawler body width direction is from 0.5% to 3% of a width direction length of the crawler body, and an end portion of the tensile body in the crawler body width direction is positioned further toward the crawler body width direction outer side than an end portion of the inclined face in the crawler body width direction, and wherein the crawler is a coreless crawler that does not have a metal core.

9. The crawler of claim 1, wherein from an edge of the inclined face, the crawler body width direction outer side of the crawler body is configured such that end portions of the crawler body have a constant thickness.

10. The crawler of claim 1, wherein the tensile body includes a portion at the crawler width direction central side, and inclined portions at the crawler body width direction outer sides of the portion, and as seen in side view of the crawler body, in curved sections, the inclined portions are inclined toward the circumferential inner side of the crawler body.

* * * * *